Patented June 19, 1928.

1,674,114

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

TRISAZO DYE AND PROCESS OF MAKING SAME.

No Drawing.   Application filed June 17, 1926. Serial No. 116,733.

This invention relates to trisazo dyes for cotton and to the method of preparing the same. More particularly it is concerned with dyes of grayish blue to gray shades of excellent fastness to light and with the method of their preparation by coupling certain aryl diazo compounds with a 1:6 or 1:7 naphthylamine-sulfonic acid, diazotizing the resulting amino-azo compound, coupling again with a 1:6 or 1:7 naphthylamine-sulfonic acid, diazotizing the resulting amino-disazo compound and finally coupling with a peri-amino-naphthol-sulfonic acid to form a trisazo dye.

The new dye compounds prepared in this manner have the constitution represented by the general formula:

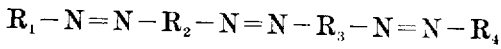

in which $R_1$ represents an aryl radical of either the benzene or naphthalene series, wherein the aryl nucleus is free from hydroxy groups and $R_2$ and $R_3$ both represent a naphthyl-sulfonic acid grouping derived from either a 1:6 or 1:7 naphthyl-amine-sulfonic acid or a mixture of 1:6 and 1:7 naphthyl-amine-sulfonic acid and $R_4$ represents a peri-amino-naphthol-monosulfonic or disulfonic acid radical.

The new dye compounds and their proparation can best be disclosed by the presentation of a number of examples of actual embodiments thereof. It is to be understood, of course, that these examples are furnished below by way of illustration only, and that the details of procedure specified therein, as well as the particular proportions, reagents, temperatures, etc., therein disclosed are susceptible of variations and substitution.

*Example 1.*—107 parts of para toluidine are diazotized in the usual way. The diazo compound is coupled to 223 parts of 1:7 Cleves acid dissolved in 3500 parts of water and 53 parts of soda ash and containing enough sodium acetate to neutralize the mineral acidity. After two hours' stirring, the coupling will be complete. The intermediate amino azo compound is filtered. The paste is stirred up with 5000 parts of water, converted to the sodium salt by addition of 40 parts of sodium hydroxide, acidified with 295 parts of a 31% hydrochloric acid solution, and then diazotized with 69 parts of sodium nitrite at 15-20° C. The diazotization will be complete in ½ hour. It is then added to a solution of 223 parts of 1:6 Cleves acid, dissolved in 3500 parts of water, and 53 parts of sodium carbonate, containing 350 parts of sodium acetate crystals. This coupling is complete after 2 hours' stirring at 15-20° C. It is heated to 70° C. and filtered. The filter cake is stirred up with 5000 parts of water; made alkaline with 40 parts of sodium hydroxide, cooled down to 5° C., acidified with 420 parts of 31% hydrochloric acid solution and diazotized with 69 parts of sodium nitrite. The diazotization is stirred at 4-7° C. for ½ hour and is then added to a solution of 239 parts of 1:8 amino-naphthol-4-sulfonic acid (S-acid) dissolved in 3000 parts of water and 420 parts of soda ash. The coupling is made at 0-5° C. The dye is salted out at 70-75° and filtered. It is soluble in water with a greenish blue color, dyeing cotton in bright greenish gray shades. The dyeings show an excellent fastness to light and discharge with hydrosulphite to a pure white.

The dye has most probably the following formula:

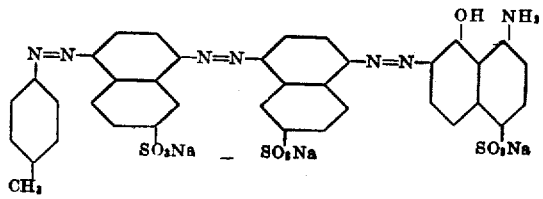

On reduction with stannous chloride it will yield the following compounds:
1 mole of para toluidine
2 moles of 1:4 naphthylenediamine-6-sulfonic acid 1 mole of 1:7 diamino-8-hyroxy naphthalene-4-sulfonic acid.

If, instead of 239 parts of S-acid, 341 parts of H-acid (mono sodium salt) are used in the last coupling, a much redder shade of gray is obtained, otherwise the dye has similar properties to that made from S-acid.

*Example 2.*—Using, instead of 107 parts of para toluidine as in Example 1, 173 parts of para sulphanilic acid as first component, and 1:7 Cleve's acid both as 2nd and 3rd component, and 341 parts of H-acid (mono sodium salt) as last component, diazotizing and coupling under similar conditions as in Example 1, a bright reddish shade of gray is obtained of similar properties to those in Example 1.

The dye obtained has most probably the following formula:

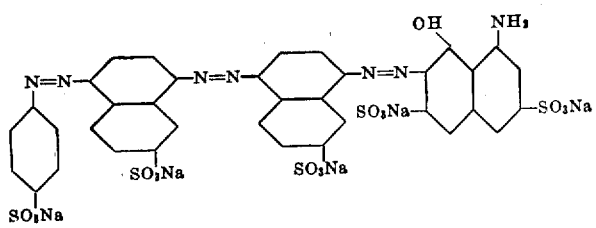

On reduction with stannous chloride the following compounds are obtained:

p-sulphanilic acid, 2 moles of 1:4 naphthylenediamine-6-sulfonic acid, and one 1:7 diamino-8-hydroxy naphthalene-3-6-disulfonic acid.

*Example 3.*—Using 223 parts of 1:6 Cleve's acid instead of 107 parts of p-toluidine as in Example 1, as first component and 1:6 Cleve's acid both as 2nd and 3rd component, and 341 parts of H-acid (monosodium salt) as last component, a neutral reddish shade of gray is obtained of similar properties to those in Example 1. The dye has most probably the following formula:

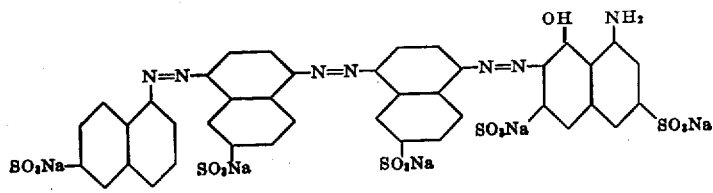

On reduction with stannous chloride it will yield the following compounds:

1:6 Cleve's acid, 2 moles of 1:4 naphthylenediamine-6-sulfonic acid, 1:7 diamino-8-hydroxy naphthalene-3-6-disulfonic acid.

Other first components than those given in the examples may be used, such as aniline, xylidine, o-toluidine, o-anisidine, etc., and their different sulfo- or carboxy acids, alpha naphthylamine, beta naphthylamine and their different mono- or disulfonic acids. As last compoents there may be used other peri amino naphthol mono- sulfonic or disulfonic acids than those illustrated, such as 1:8 amino naphthol-2:4-disulfonic acid, 1:8 aminonaphthol-4:6-disulfonic acid, etc.

When "Cleve's acid" is referred to in the claims, I intend to designate either 1:6 naphthyl-amine-sulfonic acid or 1:7 naphthylamine-sulfonic acid or a mixture of both.

By suitably varying the components and using appropriate proportions and conditions, a large number of valuable grayish blue to gray trisazo dyes for cotton may be prepared. These dyes are all characterized by an unusual affinity for cotton and an excellent fastness to light. They are adapted for direct application by the ordinary methods.

I claim:
1. A dye compound having the general formula:

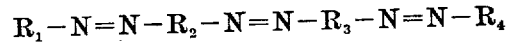

wherein $R_1$ represents an aryl radical in which the aryl nucleus is hydroxy-free $R_2$ and $R_3$ represent a 1:6 or 1:7 naphthylsulfonic acid grouping and $R_4$ represents a 1:8 amino-naphthol-sulfonic acid radical having not over two sulfonic groups.

2. The dye compound as set forth in claim 1 wherein $R_1$ comprises a naphthalene radical.

3. The dye compound as set forth in claim 1 wherein $R_1$ represents a naphthyl-sulfonic acid radical.

4. The dye compound set forth in claim 1 wherein $R_1$ represents a 1:6-naphthyl sulfonic acid residue and $R_4$ represents a 1-amino-8-naphthol-3:6-disulfonic acid radical.

5. In the process of making a trisazo dye which comprises diazotizing an aryl-amino compound having no hydroxy group attached to the aryl nucleus, coupling the resulting diazo compound with a Cleve's acid, diazotizing the resulting amino-azo compound, coupling the resulting diazo-azo compound with a Cleve's acid to form an amino-disazo compound, and diazotizing the amino-disazo compound to form a diazo-disazo compound the step of coupling the latter with a peri-amino-naphthol-sulfonic acid radical having not two sulfonic groups.

6. The process of making a trisazo dye which comprises diazotizing a naphthyl-amino-compound, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo-compound and coupling the latter with a peri-amino-naphthol-sulfonic acid radical having not over two sulfonic groups.

7. The process of making a trisazo dye which comprises diazotizing a Cleve's acid, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a peri-amino-naphthol-sulfonic acid radical having not over two sulfonic groups.

8. The process of making a trisazo dye which comprises diazotizing an aryl-amino compound having no hydroxy group attached to the aryl nucleus, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a 1-amino-8-naphthol-3:6-disulphonic acid radical.

9. Textile material colored with the dyestuff set forth in claim 1.

10. The process of making a trisazo dye which comprises diazotizing a naphthyl-amino-compound, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a 1-amino-8-naphthol-3:6-disulphonic acid radical.

In testimony whereof I affix my signature.

HENRY JORDAN.

CERTIFICATE OF CORRECTION.

Patent No. 1,674,114.  Granted June 19, 1928, to

HENRY JORDAN.

It is hereby certified that error appears in the printed specification of the above numbered patent requiring correction as follows: Page 1, line 88, for the misspelled word "hyroxy" read "hydroxy"; page 2, line 43, for the word "compoents" read "components"; page 3, line 4, claim 5, insert the word "over" before the word "two"; and that the said Letters Patent should be read with these corrections therein that the same may conform to the record of the case in the Patent Office.

Signed and sealed this 7th day of August, A. D. 1928.

(Seal)

M. J. Moore,
Acting Commissioner of Patents.

disazo compound to form a diazo-disazo compound the step of coupling the latter with a peri-amino-naphthol-sulfonic acid radical having not two sulfonic groups.

6. The process of making a trisazo dye which comprises diazotizing a naphthyl-amino-compound, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo-compound and coupling the latter with a peri-amino-naphthol-sulfonic acid radical having not over two sulfonic groups.

7. The process of making a trisazo dye which comprises diazotizing a Cleve's acid, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a peri-amino-naphthol-sulfonic acid radical having not over two sulfonic groups.

8. The process of making a trisazo dye which comprises diazotizing an aryl-amino compound having no hydroxy group attached to the aryl nucleus, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a 1-amino-8-naphthol-3:6-disulphonic acid radical.

9. Textile material colored with the dyestuff set forth in claim 1.

10. The process of making a trisazo dye which comprises diazotizing a naphthyl-amino-compound, coupling the resulting diazo compound with a Cleve's acid, diazotizing the resulting amino-azo compound, coupling the resulting diazo-azo compound with a Cleve's acid to form an amino-disazo compound, diazotizing the amino-disazo compound to form a diazo-disazo compound and coupling the latter with a 1-amino-8-naphthol-3:6-disulphonic acid radical.

In testimony whereof I affix my signature.

HENRY JORDAN.

---

CERTIFICATE OF CORRECTION.

Patent No. 1,674,114.  Granted June 19, 1928, to

HENRY JORDAN.

It is hereby certified that error appears in the printed specification of the above numbered patent requiring correction as follows: Page 1, line 88, for the misspelled word "hyroxy" read "hydroxy"; page 2, line 43, for the word "compoents" read "components"; page 3, line 4, claim 5, insert the word "over" before the word "two"; and that the said Letters Patent should be read with these corrections therein that the same may conform to the record of the case in the Patent Office.

Signed and sealed this 7th day of August, A. D. 1928.

M. J. Moore,
Acting Commissioner of Patents.

(Seal)